United States Patent Office 3,211,684
Patented Oct. 12, 1965

3,211,684
GLASS-RESIN COUPLING COMPOSITION
William J. Eakins, Wilbraham, Mass., assignor, by mesne assignments, to De Bell & Richardson, Inc., Hazardville, Conn., a corporation of Connecticut
No Drawing. Filed Aug. 29, 1960, Ser. No. 52,327
2 Claims. (Cl. 260—29.2)

This invention relates to compositions for bonding synthetic resins to glass fibers in making glass-resin laminates, composites and the like.

It is well known that chemicals such as alkyl alkoxy silanes and organo chromic chloride complex compounds will react with the surface of E-type glass to produce a serviceable bond between the glass and various synthetic resin mixtures. While these chemicals produce suitable glass-resin bonding, without additives they do not provide adequate protection against glass filament damage or breakage. The friable character of multi-filament glass has resulted in restricting the development of processes for making glass-resin structures since the overriding consideration has been to minimize handling. In this connection it has been found impractical to apply the aforementioned coupling chemicals to the glass as it is being formed, or at the "bushing," as it is called. While a size is often applied at the bushing to enable the glass to be twisted, spooled and otherwise handled as required, many such sizes are not coupling agents and must be removed from the surface of the glass by some suitable process such as heat cleaning before a coupling agent may be applied.

Removal of the size makes the glass filaments extremely friable and difficult to handle. Attempts to overcome this problem have involved the use of additives to improve the handling characteristics of the glass and to formulate coupling agents which may be applied at the bushing with satisfactory results. However, the additives presently in use are insoluble in water and, therefore, the coupling agents are applied to the glass in an emulsified state. As is well known, emulsions tend to vary in chemical composition and uniform results are not readily obtainable with emulsion type coupling compositions. Moreover, there is a tendency of coagulation under changing atmospheric conditions, making such coupling agents relatively difficult to prepare and use. These difficulties are evidenced by the continued use by many glass manufacturers of sizes which must be removed before application of coupling agents notwithstanding the availability of emulsion type coupling agents.

The principal object of this invention is to provide glass-resin coupling or bonding agents for use in the manufacture of glass-resin composite structures which improve the flexural strength of such structures and protect the glass filaments during handling to substantially reduce the problems of handling multi-filament glass.

Another object of this invention is to provide improved glass-resin bonding agents which may be applied to glass strands during forming.

A further object of this invention is to provide glass-resin bonding agents which may be applied in water solutions to glass strands.

The bonding or coupling agents embodying this invention are characterized by materials which react to provide a polymeric bulky solid material bonded to the surface of the glass. This polymeric material lubricates and protects the glass filaments during handling and is chemically combinable with bonding resins used in making glass-resin composites.

In accordance with this invention, an epoxide having at least two epoxide groups and an amine having at least two amine groups are dissolved in a suitable solvent, preferably water, containing in solution a glass-resin coupling agent such as an amino alkyl alkoxy silane. The amine and epoxide groups are reactive to form with the silane a polymeric material chemically bonded to the surface of glass fibers. The relative proportions of amine and epoxide are selected to provide unreacted epoxide groups reactive with anhydride, amine or aromatic hydroxyl groups of epoxy or phenolic resin mixtures, which may be applied in making glass-resin composite structures.

Epoxides within the scope of this invention are those having not less than two epoxide groups per molecule and a water solubility not less than 1% by weight. Preferably, the epoxide compounds may be further characterized by epoxide groups of differential reactivity. Such epoxides are known as bi-reactive having one epoxide group which tends to be amine reactive and another epoxide group which tends to be anhydride reactive. While superior results are obtained by utilizing bi-reactive epoxide formulations, other formulations having epoxides of the same chemical reactivity may be used to give a polymeric material which improves the handling characteristics of multi-filament glass.

An example of an epoxide compound having requisite chemical reactivity and preferred water solubility for use in carrying out this invention is vinyl cyclohexene dioxide, hereinafter referred to as VCHDO, illustrated by the following general formula:

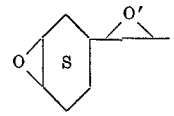

In the above formula "O" represents a ring epoxide group which tends to react with anhydrides, while "O'" represents an acyclic epoxide which tends to react with amine groups. The acyclic epoxide has a tendency to react with the amine groups of the coupling agent and polyamine. The ring epoxide has a tendency to react with anhydrides such as endo-cis-bicyclo[2.2.1]-5-heptene-2,3-dicarboxylic anhydride, the latter being a curing agent for epoxy resins. If instead of an epoxy, a phenolic resin is to be employed in making a resin bonded composite, the aromatic hydroxyl groups of the phenolic resin are reactive with free epoxide groups of the diepoxide in the presence of amine groups.

Another example of a bi-reactive epoxide having requisite water solubility and chemical reactivity is limonene dioxide. While the latter compound is less soluble in water (3.24% by weight) than VCHDO (18% by weight), its solubility is sufficient to enable it to be used in formulations employing water as a solvent.

In addition to the bi-reactive epoxides given above, chain compounds such as 1,4-butanediol diglycidyl ether and other similarly acting compounds are included in the following formulations which represent classes of compounds possessing sufficient water solubility and chemical reactivity for use in glass-resin coupling agent formulations embodying the invention:

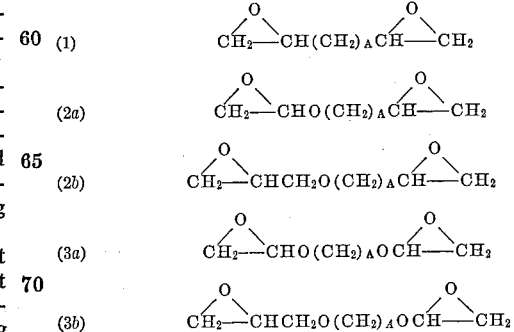

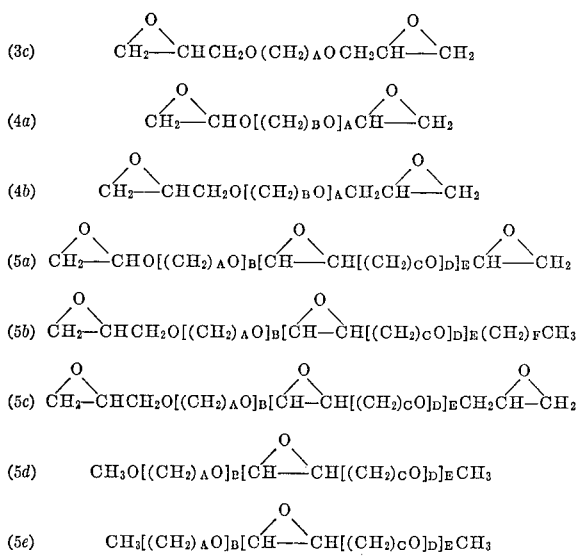

(3c) $CH_2\overset{O}{-}CHCH_2O(CH_2)_AOCH_2CH\overset{O}{-}CH_2$ (4a) $CH_2\overset{O}{-}CHO[(CH_2)_BO]_ACH\overset{O}{-}CH_2$ (4b) $CH_2\overset{O}{-}CHCH_2O[(CH_2)_BO]_ACH_2CH\overset{O}{-}CH_2$ (5a) $CH_2\overset{O}{-}CHO[(CH_2)_AO]_B[CH\overset{O}{-}CH[(CH_2)_CO]_D]_ECH\overset{O}{-}CH_2$ (5b) $CH_2\overset{O}{-}CHCH_2O[(CH_2)_AO]_B[CH\overset{O}{-}CH[(CH_2)_CO]_D]_E(CH_2)_FCH_3$ (5c) $CH_2\overset{O}{-}CHCH_2O[(CH_2)_AO]_B[CH\overset{O}{-}CH[(CH_2)_CO]_D]_ECH_2CH\overset{O}{-}CH_2$ (5d) $CH_3O[(CH_2)_AO]_B[CH\overset{O}{-}CH[(CH_2)_CO]_D]_ECH_3$ (5e) $CH_3[(CH_2)_AO]_B[CH\overset{O}{-}CH[(CH_2)_CO]_D]_ECH_3$ Suitable amines for use in the formulations embodying the invention are those which have at least two amine groups each of which includes at least one active hydrogen. The following compounds are examples of water soluble polyamines having the requisite chemical reactivity to form with the epoxides and silanes a polymeric glass-resin coupling agent: 1-piperazine ethanol (1–PE), 1,4-piperazine diethanol and piperazine.

Amines represented by these examples are covered by the following general formula:

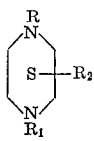

wherein: R and $R_1$ may be H or $(CH_2)_nNH_2$ and $R_2$ may be H, $CH_3$ or $(CH_2)_nOH$.

While it is the preferred form of this invention to apply the coupling compositions to glass in an aqueous solution, the following are examples of polyamines not sufficiently soluble in water to be so applied but which may be applied by using an anhydrous solvent such as toluene: 4,4'-diamino diphenyl sulfone and meta-phenylene diamine.

From the standpoint of strand handling, ease of application and the like, it is preferable to apply coupling compositions in water as a solvent. However, under certain circumstances the use of anhydrous solvents may provide suitable results.

The following formulas are examples of classes of amino alkyl alkoxy silanes of sufficient water solubility to be used in the coupling formulations:

$[CH_3(CH_2)_nO]_3Si(CH_2)_{n'}NH_2$ $[CH_3(CH_2)_nO]_3Si(CH_2)_{n'}\overset{H}{N}(CH_2)_{n''}NH_2$

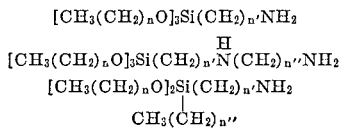

in which $n'+n''$ does not exceed eight.

Specific examples of coupling agents within the classes listed above are delta amino butyl methyl diethoxy silane and gamma-amino propyl triethoxy silane, the latter being known commercially as "A–1100," which is represented by the following formula:

$(C_2H_5O)_3Si-CH_2-CH_2-CH_2-NH_2$

After applying to the surface of glass a composition in solution containing a diepoxide (VCHDO), diamine (1–PE) and coupling agent (A–1100), the glass reactive side of the coupling agent reacts with water on the surface of the glass to yield silanol

which in turn reacts with the glass hydroxyls to produce siloxane links Si—O—Si which bond with the glass and themselves, ethyl alcohol ($C_2H_5OH$) being liberated in the solution. The diepoxide, such as the VCHDO, is linked to the coupling agents by reaction of the acyclic epoxide O' with the amine group ($NH_2$) of the silane. The reaction product may be represented as follows:

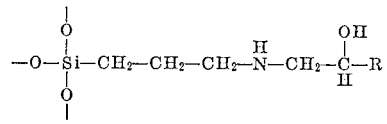

where R represents the remainder of diepoxide VCHDO. The diepoxide also reacts with the diamine to form a polymeric material on surface of the glass that is of sufficient bulk to resist cutting and provide some lubrication for the glass. This reaction occurs in a manner similar to that which takes place between the amino silane and the diepoxide. The amount of diamine used in the formulation is insufficient to react with all the epoxide groups thus leaving unreacted epoxides which are free to react with the bonding resin.

Using a solution having a total solids content of 0.5–15% by weight and containing between 0.1–6% by weight amino silane to 0.4–9% additives consisting of between 0.2–0.8 mol 1–PE/1.0 mol VCHDO, a coating is obtained which will provide good to excellent filament protection. Moreover, composite structures obtained using multi-filament glass so coated and an epoxy bonding resin are highly resistant to the effects of boiling water.

The following examples are illustrative of various formulations embodying the invention in which the coupling compositions were applied to E-type glass strand-No. 150 1/0 having 204 filaments per strand. After the compositions were applied, the strands were wound on a mandrel. During winding, a thermosetting resin, such as diglycidyl ether of bisphenol A, or acid based phenolics, was applied to the strand, the resin being reactive with the unreacted epoxides and/or amines of the polymeric material bonded to the glass. Thereafter the resin was cured, forming composite resin-glass hoops, the strength and moduli of which were tested dry and after 12 hours in boiling water.

In Examples I–IV, the compositions listed below were applied to heat cleaned glass strands. The strand handling properties and flexural strength of resin bonded composite structures were tested with the following results:

*Example I*

[2% solids solution in water—1 part A–1100 and 3 parts additives, consisting of 1 mol 1,4-dibutanediol diglycidyl ether and 0.5 mol 1–PE]

| Glass Content of Composite | Strand Handling Properties | Flexural Strength, $10^3$ p.s.i. | |
|---|---|---|---|
| | | Dry | Wet |
| 83.8% | Good | 234 | 193 |

*Example II*

[2% solids solution in water—1 part A–1100 and 3 parts additives consisting of 1 mol VCHDO and 0.5 mol 1,4-piperazine diethanol]

| Content | Handling | Dry | Wet |
|---|---|---|---|
| 83.6% | Excellent | 227 | 214 |

Example III

[2% solids solution in water—1 part A-1100 and 3 parts additives consisting of 1 mol VCHDO and 0.5 mol 1-PE]

| Content | Handling | Dry | Wet |
|---|---|---|---|
| 83.5% | Excellent | 225 | 215 |

Example IV

[2% solids solution in water—1 part A-1100 and 1 part additives consisting of 1 mol VCHDO and 0.4 mol 1-PE]

| Content | Handling | Dry | Wet |
|---|---|---|---|
| 83.5% | Excellent | 224 | 216.5 |

The following test was conducted for comparative purposes and illustrates the advantages of the coupling agent compositions embodying this invention. A solution of 1% solids in water consisting solely of A-1100 was applied to a heat cleaned strand with the following results:

| Content | Handling | Dry | Wet |
|---|---|---|---|
| 83.4% | Good | 209.5 | 196 |

In Example V, the composition given below was applied to glass strand at the "bushing."

Example V

[7½% solids solution in water—1 part A-1100 and 3 parts additives consisting of 1 mol VCHDO and 0.5 mol 1-PE]

| Content | Handling | Dry | Wet |
|---|---|---|---|
| 83.5% | Good | 220 | 188 |

The following test was conducted for comparative purposes. A 7½% solids solution in water consisting of A-1100 was applied to a glass strand at the bushing with the following results:

| Content | Handling | Dry | Wet |
|---|---|---|---|
| 83.5% | Poor | 198 | 180 |

Based on the examples given above, it can be seen that composite structures of superior strength were produced using epoxides and amines as additives for silane coupling agents. Moreover, the handling characteristics of the glass was markedly improved in consequence of the superior filament protection afforded by these binder solutions.

Having thus described my invention what is claimed is:

1. Glass resin coupling composition in the form of an aqueous solution having a total solids content of from 0.5 to 15% by weight consisting essentially of an amino alkyl alkoxy silane, a reactive amine curing agent selected from the group consisting of 1-piperazine ethanol, 1,4-piperazine diethanol and piperazine, and a bireactive polyepoxide selected from the group consisting of vinyl cyclohexene dioxide and limonene dioxide, said solution containing between .2 and .8 mol of the amine curing agent for each mol of the polyepoxide, whereby the amine promotes only partial cure of the polyepoxide on the surface of the glass and also provides unreacted epoxide groups for subsequent reaction with a bonding resin.

2. Glass resin coupling composition as set forth in claim 1 in which said silane is selected from the group consisting of delta amino butyl methyl diethoxy silane and gamma amino propyl triethoxy silane.

References Cited by the Examiner

UNITED STATES PATENTS

| | | | |
|---|---|---|---|
| 2,799,598 | 7/57 | Biefeld et al. | 156—167 |
| 2,819,245 | 1/58 | Shorr. | |
| 2,843,560 | 7/58 | Mika | 260—42 |
| 2,865,886 | 12/58 | Greenlee | 260—47 |
| 2,912,389 | 11/59 | Phillips et al. | 260—47 |
| 2,931,739 | 4/60 | Marzocchi et al. | 117—126 |
| 2,946,701 | 7/60 | Plueddemann | 117—126 |
| 2,948,688 | 8/60 | Bender | 260—2 |
| 2,965,609 | 12/60 | Newey | 260—47 |
| 2,970,972 | 2/61 | Wear et al. | 260—47 |
| 2,974,062 | 3/61 | Collier | 117—126 |
| 3,018,258 | 1/62 | Meier et al. | 260—47 |
| 3,023,190 | 2/62 | Damusis | 260—47 |
| 3,032,460 | 3/62 | Chipman et al. | 156—330 |

FOREIGN PATENTS 816,056   7/59   Great Britain.

OTHER REFERENCES

Skeist: Epoxy Resins, N.Y., Reinhold, 1959, p. 36.

"Epoxy Resins" by Skeist, published by Reinhold publishing Corp., 2nd printing, December 1959 (pages 6 and 23–29).

ALEXANDER WYMAN, *Primary Examiner.*

EARL M. BERGERT, DONALD ARNOLD, *Examiners.*